Jan. 31, 1933. F. H. BATEMAN ET AL 1,895,962
METHOD OF PLANTING POTATOES
Filed July 29, 1929   2 Sheets-Sheet 2

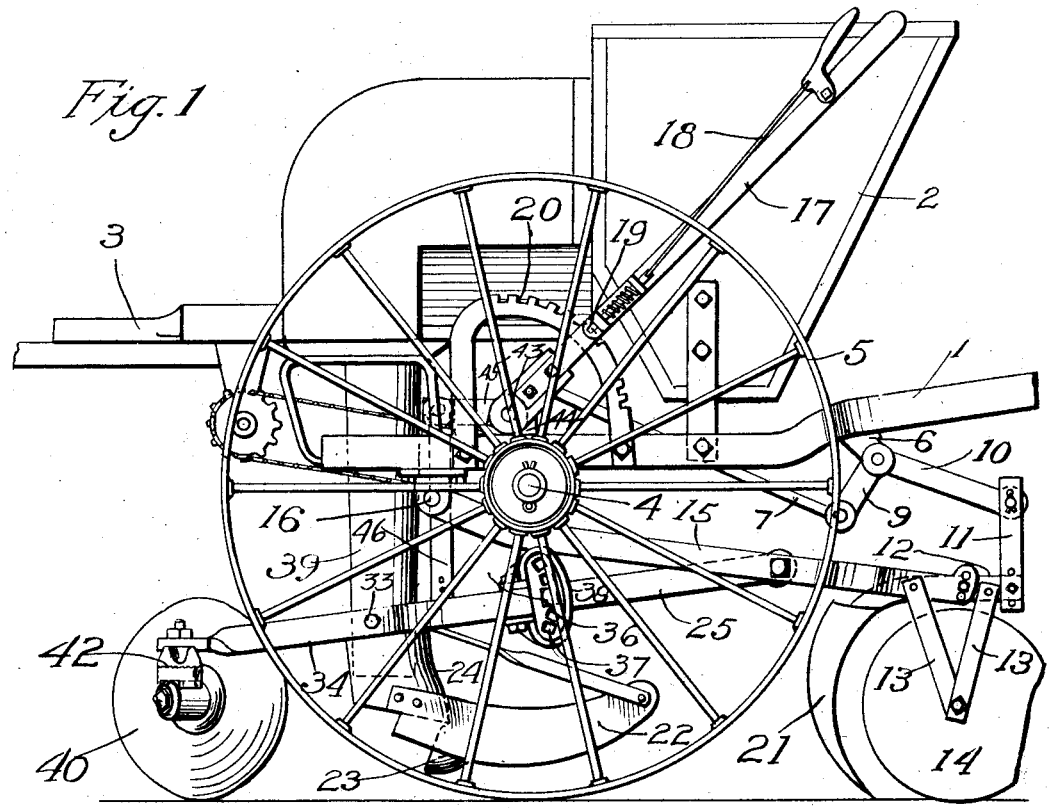
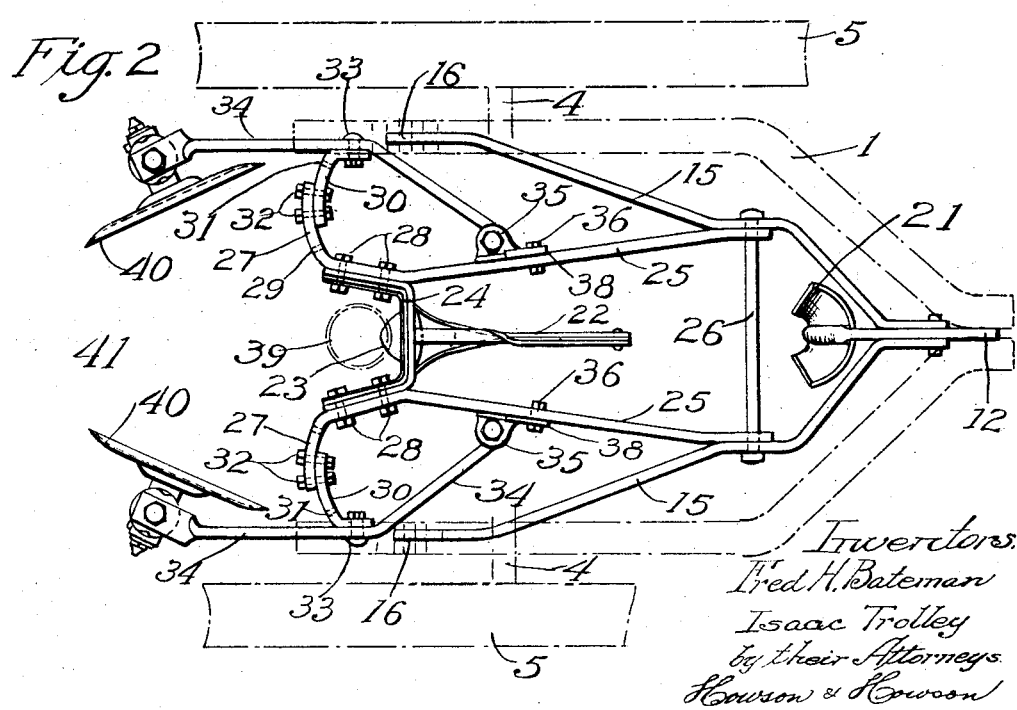

Inventors:
Fred H. Bateman
Isaac Trolley
by their Attorneys
Howson & Howson

Patented Jan. 31, 1933

1,895,962

UNITED STATES PATENT OFFICE

FRED H. BATEMAN, OF GRENLOCH, NEW JERSEY, AND ISAAC TROLLEY, OF YORK, PENNSYLVANIA, ASSIGNORS TO FRED H. BATEMAN COMPANY, OF PHILADELPHIA, PENNSYLVANIA, A CORPORATION OF PENNSYLVANIA

METHOD OF PLANTING POTATOES

Application filed July 29, 1929. Serial No. 381,880.

This invention relates to a method of planting potatoes, contemplating the deduction of a planter which may be employed in planting potatoes in a new manner and which may, if so desired, be readily converted for use in planting in the ordinary manner.

The ordinary practice in potato planting is to form a relatively deep V-bottom furrow in which the seed potatoes are placed at spaced intervals by a boot following the furrow opening. This boot is in turn followed by a furrow closing means which in the present type of potato planter is so constructed that it not only returns to the furrow the earth which was removed in formation thereof but likewise adds to this earth, earth removed from opposite sides of the furrow so that over the potatoes a ridge is formed. The potatoes proper when planted in this manner are disposed from 6 to 8 inches below the level of the soil lying thereabove and 3 to 4 inches below the normal level of the surrounding earth. This method of potato planting is disadvantageous in that it is difficult for the warmth of the rays of the sun to penetrate through the intervening layer of earth and quicken the seed, and accordingly germination is usually slow and in many instances under unfavorable conditions, such as a wet spell succeeding planting, the seeds rot and germination is poor. Additionally, the plants in endeavoring to force their way quickly to the surface after growth has started usually grow through one side or the other of the ridge and would thus have a normal tendency to cause a wider plant row than would result if this resistance to growth were not present. For this reason it becomes necessary for the grower to break down the top of the ridge after germination has started. Constant attention must be paid or the growth of the plants will progress to such an extent that it is impossible to break down the ridge and in this event cultivation of the plants becomes difficult. Furthermore, it has been found that where there is an occurrence of rhizoctonia the severity of the disease increases in proportion to the depth of the covering of the soil.

An important object of the present invention is the provision of a potato planter permitting the potatoes to be so planted that the original earth covering will be relatively light so that the plants may receive the full benefit of the warming action of the sun's rays so that they will germinate quickly and which at the same time plants the potatoes in such fashion that as they grow, earth may be conveniently placed about the growing plants to increase the surface covering without raising the surface covering above the level of the surrounding ground. Such planting results in narrow plant rows, a decided reduction in the loss of seed through rotting and a correspondingly increased yield, and in the reduction of losses from the disease of rhinzoctonia where this occurs. Attention is directed to the fact that with the shallow covering of the potatoes at the bottom of the furrow subsequent coverings may be made at any time even after the plants have attained considerable growth and such covering would tend to destroy any weeds lying close to the plants. Thus this method further eliminates the constant attention which is necessary with ordinary planting.

A further object of the invention is to provide apparatus of this character which may be readily adjusted for operation in the ordinary manner if the grower desires that it shall be so used, thus enabling the grower to employ either or both methods of planting.

A further object of the invention is to produce a machine which is capable of providing a relatively deep furrow depositing the potatoes therein and then covering these potatoes by removing from the walls of the furrow slices which cover the potato and convert the V-shaped planting furrow into a relatively straight-sided trench.

A further object of the invention is to produce a machine of this character which may be used in making up rows in which fertilizer has been deposited and a ridge of soil built up in which certain types of seeds and plants such as sweet potatoes, tomatoes, cabbage, canteloupe, water-melon, or the like may be planted.

These and other objects we attain by the construction shown in the accompanying drawings wherein, for the purpose of illustration, we have shown a preferred embodiment of our invention and wherein:

Fig. 1 is a side elevation of the assembled planter;

Fig. 2 is a plan view, parts being shown in skeleton outline, of the frame, gang, and covering discs, the discs and gangs being adjusted for deep covering;

Fig. 4 is a skeleton perspective illustrating the lifting mechanism; while

Figure 5:
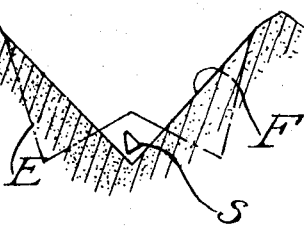
Fig. 5 is a detail sectional view showing in solid lines the formed planting trench and in dotted lines the trough produced when the covering discs have passed.

In accordance with the method of our invention a relatively deep furrow F (Fig. 5) is first formed in which the seed potatoes S are dropped. These potatoes are then covered by slicing from the walls of the V-shaped furrow F relatively thin slices of earth as indicated at E which are thrown into the bottom of the trough and cover the seed potatoes. The V-shaped trough is thus converted to a relatively wide-bottomed and substantially straight-sided trench in the center of the bottom of which the covered seed potatoes lie. This may be accomplished by the mechanism illustrated in the remaining figures in the drawings which we will now describe.

At 1 is broadly indicated the frame of the planter, on which are mounted the usual hopper 2 and feeder wheel, the container of which wheel is indicated at 3. The frame 1 is shown as carried on an axle 4 having wheels 5, 5, preferably of relatively great tractive surface.

Secured in any suitable manner to the frame 1 as by the lug 6, is a system of linkage comprising a connecting rod 7 pivotally secured to an arm 9 of a rocker arm having an arm 10, and a link 11 connected at one end to the arm 10 and at the other to a plow-share 21. Secured to the plow-share 21 is a suspension 13 for a disc or the like 14. Also secured to the plow-share are a plurality of elongated links 15 pivoted at their outer ends at 16 to the frame 1. The links 15 will thus be seen to form a yoke-shaped member. The arm 7 is pivotally secured at its end remote from the arm 9 to an operating handle 17. This handle carries a conventional type of clutch 18 having a pawl 19 adapted for reception in the ordinary type of segmental ratchet 20 secured to the frame 1. Movement of the operating handle 17 through a vertical angle will result in a raising or lowering of the disc 14 and the plow 21.

The disc 14 acts as a guide to define the furrow to be formed by the plow 21. In the preferred operation of the machine, fertilizer is dropped by a suitable mechanism along the sides of the furrow so opened. A plowing shoe 22 then operates to dig a channel in the bottom of the furrow, which has by this time been partly filled with loose earth, for the reception of the potato seeds in accurate and predetermined position with respect to the furrow. The knob 23 on the shoe 22 is especially designed to form the necessary channel.

The shoe 22 above described is carried by a yoke member 24, in turn retained between cooperating arms 25, 25, each secured at their inner end to a cross brace 26 which rigidly secures the links 15 in position, and terminating at their outer ends in outwardly-turned portions 27, 27. The arms 25 are fastened in any suitable manner to the yoke member 24, as by bolts 28, while their outer ends are provided with a plurality of bolt holes 29, for the adjustable reception of angle members 30. also provided with a plurality of bolt holes 31. Bolts 32 are shown as securing the extensions 27 and angle members 30 in their assembled relation, although it is of course contemplated that any desired type of adjustment may be employed. The angle members are each secured at their outer ends by suitable means such as bolts 33 to arms 34, 34, pivotally swinging from brackets 35, 35 mounted on the arms 25, 25. The arms 34, brackets 35, arms 25, angle members 31, portions 27 of the arms 25, and yoke 24 all constitute a swingable unit through a limited trajectory. The normal vertical position of the arms 34 with respect to the links 15 may be adjusted in a number of different manners, as for instance, by inserting the bolt 36 through any of the bolt-holes 37 in the segment or quadrant 38.

Figure 3:
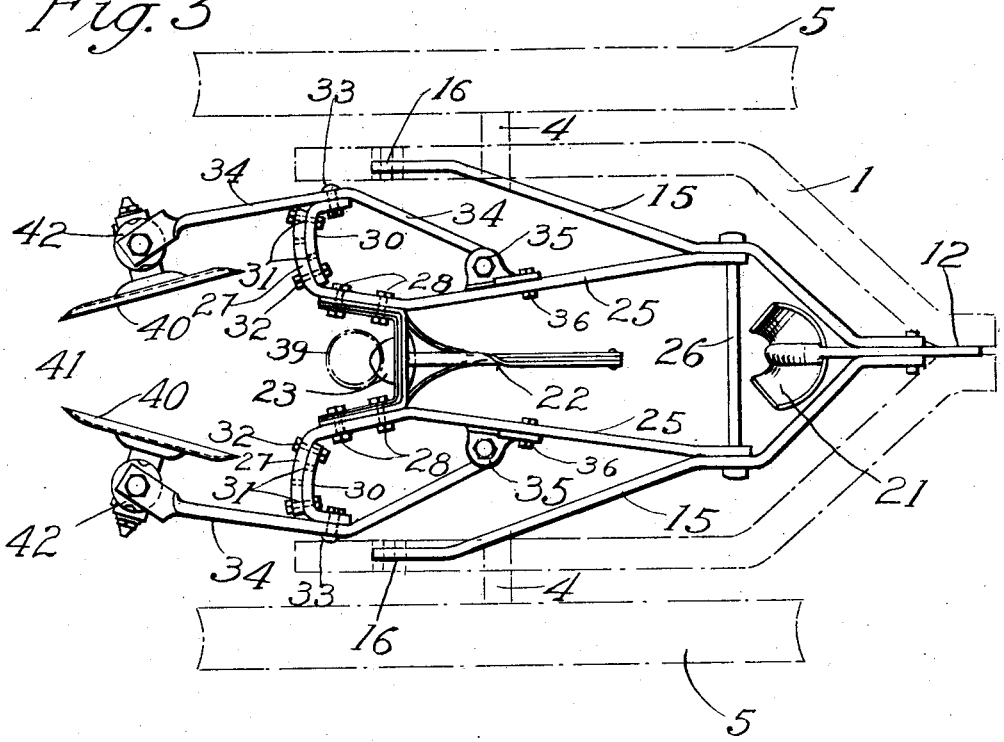
Fig. 3 is a view similar to Fig. 2, illustrating the discs and gang in position for shallow planting.
Figure 4:
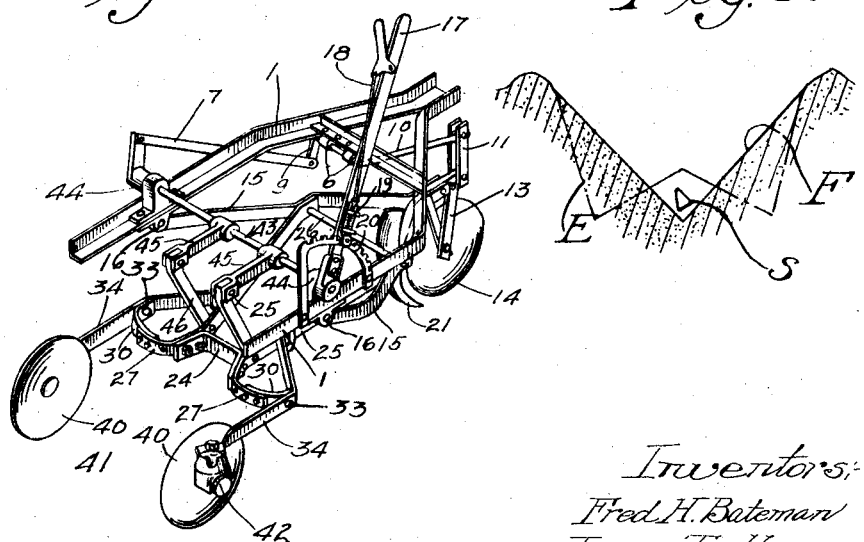

As will be obvious from an inspection of Figs. 1 and 3, the operating handle or arm 17 is fixed to and adapted to rotate a shaft 43, the latter being journalled in suitable bearings 44, 44 in the frame 1. At one end of the shaft 43 the connecting rod 7 is secured, the purpose of which rod has been developed in the early part of the specification. Also mounted for rotation with the rod 43 are a plurality of links 45, 45, connected at their outer ends to hangers 46, 46. These latter are each secured to a corresponding arm 25, adjacent the outermost extremity thereof, and are adapted to elevate or lower the rear portion of the gang, together with its discs 40, 40, simultaneously with a similar movement of the front part of the gang, under the influence of the connecting rod 7. In this manner adequate adjustment or either deep or shallow planting is insured.

After the furrow has been dug, the fertilizer spread, and the trench dug, all in the manner described, a seed is dropped from the feed-wheel, through the spout 39, to the furrow. The covering discs 40 preferably are unobstructed on their inner or operable surfaces, in order to avoid offering any impediment or obstruction to the soil which is being rolled into the ridge, and acting to throw the earth back over the seeds, supplying a thorough protection for the potatoes and to a certain extent mixing the earth and fertilizer together. The setting of the planter for the old, deep or ridged style planting is shown in Fig. 2, wherein it will be noted that the arms 34 are separated to their greatest extent, and that the discs 40 are inclined at a large angle to the longitudinal center line of the machine, in order to scoop the necessary amount of earth into the furrow to fill the same and form the usual ridge.

If now, it is desired to employ the machine of Fig. 2 for shallow planting, it is merely necessary to remove the bolts 32, move the arms 34 and the angle plates 30 closer together, and reinsert the bolts. It will be found that with the machine in this condition, however, the covering discs 40 will scoop in too large an amount of earth, causing choking in the space 41 between the discs. To prevent this, adjustment of the discs 40 is permitted by means of the rosettes 42, so that the angular relation of the discs with respect to the longitudinal center line of the planter can be quickly shifted at will. With the discs close together and in the angular relation shown in Fig. 3, the machine is in condition for shallow planting. The discs are then located within the walls of the furrow and turn a sufficient quantity of soil in the form of slices E cut from the walls of the furrow to cover the seed to the desired depth without filling the furrow. It will be realized that all this is the work of but a few moments, and that the machine forms a distinct advance in the art.

It is of course understood, that the invention is susceptible to numerous modifications and adaptations, and it is intended that it be limited only by the scope of the appended claims.

We claim:

1. A method of planting seed potatoes consisting in forming a relatively deep furrow having downwardly converging walls, depositing the seeds therein and removing from the walls of the furrow below the upper ends thereof thin slices of earth to cover the seeds.

2. A method of planting seed potatoes consisting in forming a relatively deep furrow having downwardly converging walls, depositing the seeds therein and removing from the walls of the furrow thin slices of earth to cover the seeds without filling the furrow.

FRED H. BATEMAN.
ISAAC TROLLEY.